United States Patent [19]

Payne

[11] Patent Number: 4,846,485
[45] Date of Patent: Jul. 11, 1989

[54] MULTI-PURPOSE STORAGE, TRANSPORT, AND EQUIPMENT SUPPORT APPARATUS

[76] Inventor: James S. Payne, 1524 Virginia St. East, Charleston, W. Va. 25311

[21] Appl. No.: 104,546

[22] Filed: Sep. 30, 1987

Related U.S. Application Data

[63] Continuation of Ser. No. 802,738, Nov. 29, 1985, abandoned.

[51] Int. Cl.$^4$ .......................... B62B 1/04; B62B 1/12
[52] U.S. Cl. .................... 280/47.18; 280/47.2; 280/47.27; 280/47.28; 280/47.37 R; 280/47.315
[58] Field of Search ................ 280/655, 43.12, 47.19, 280/47.2, 47.27, 47.28, 47.34, 47.37 R, 79.1 A, 47.18, 47.21, 47.24, 47.26, 659, 651, 652, 654

[56] References Cited

U.S. PATENT DOCUMENTS

| D. 238,980 | 2/1976 | Bates | D87/5 E |
|---|---|---|---|
| 1,085,500 | 1/1914 | Shoberg | 160/135 |
| 1,150,964 | 8/1915 | Phelps | 280/47.28 |
| 2,277,302 | 3/1942 | Chenette | 280/47.2 |
| 2,818,988 | 1/1958 | Dunkin | 414/457 |
| 3,179,270 | 4/1965 | Taragos | 280/47.18 |
| 3,677,573 | 7/1972 | Chin | 280/43.1 |
| 3,857,579 | 12/1974 | Hoodenpyle | 280/47.2 |
| 3,863,945 | 2/1975 | Dunstan | 280/35 |
| 3,970,835 | 7/1976 | Crete | 240/1.3 |
| 3,998,476 | 12/1976 | Kazmark, Sr. | 280/47.37 |
| 4,008,790 | 2/1977 | Eiteljorg, II | 190/44 |
| 4,523,256 | 6/1985 | Small | 362/11 |
| 4,550,930 | 11/1985 | Proffit | 280/655 |

FOREIGN PATENT DOCUMENTS 2452731  5/1976  Fed. Rep. of Germany ..... 280/79.1 A Primary Examiner—Charles A. Marmor
Assistant Examiner—Richard Camby
Attorney, Agent, or Firm—Shlesinger & Myers

[57] ABSTRACT

Provided herein is an integrated storage transport and equipment support configuration featuring a wheeled, cart-like base, at least one equipment container attached to the base. The dolly having an attachment at the bottom to engage the base connection and having wheels, an elongated handle, attachable connection for engaging the base and a clamp disposed on the handle to clamp on the container whereby the apparatus can be transported in a cart configuration or a dolly configuration.

11 Claims, 4 Drawing Sheets

MULTI-PURPOSE STORAGE, TRANSPORT, AND EQUIPMENT SUPPORT APPARATUS

This is a continuation of application Ser. No. 802,738, filed Nov. 29, 1985 now abandoned.

TECHNICAL FIELD

This invention relates to an apparatus for storage, transport and support of equipments and more particularly to an easily assembled and disassembled combination device including at least one storage container, a wheeled base for the container, a dolly with an extensible handle all providing an integrated unit for multiple mode transport and support of photographic equipment.

BACKGROUND OF THE INVENTION

A photographer who leaves his studio to go out on photographic assignment is faced with a myriad of problems. To begin with, every time he leaves the studio he must go through the painstaking process of choosing which equipment will be needed for that particular assignment. When the photographer makes these choices he runs the almost inevitable risk of forgetting something. Professional photographic equipment also tends to be expensive, relatively delicate, and cumbersome. Photographic locations, on the other hand run the gamut including both indoor and outdoor sites that present logistical problems. The photographer may have to move his equipment up and down stairs, around sharp corners, through doorways, over uneven terrain or in and out of a car trunk just for a single assignment. Equipment transport problems are, therefore, of paramount concern to the assignment photographer. Once on location, the photographer's problems do not end but rather change in character. Additional equipment is usually required, since few locations have the lighting or reflecting means necessary for quality photography.

Conventional photographic equipment cases have tended to comprise box-like structures that are particularly heavy and/or bulky to transport over any great distance. These cases have also been limiting with respect to the amount and type of photographic equipment that can be taken on location. Furthermore, wheeled carrying devices have generally been designed without the specific needs of the professional photographer in mind. Photographic equipment storage or carrying devices that also combine a means to support such equipment while in use are illustrated in several patents. For example, Chin, U.S. Pat. No. 3,677,573, discloses a photographic equipment cart having two sets of wheels which are interchangeable, one set for another, so that the cart can be readily converted from outdoor to indoor use and vice versa. The cart is capable of transporting equipment such as that used by a photographer and also providing a steady base for the camera mount. Parts of the cart are foldable and others collapsible for convenience in storing the cart in a confined space.

Crete, U.S. Pat. No. 3,970,835, illustrates a photographic light boom and camera support apparatus adapted to be carried on a mobile tripod with the boom extending laterally and upwardly from the camera support. The boom supports three lighting devices two of which are adapted to be moved to positions at the same side of the boom, or one may be at one side and the other at the opposite side.

Those devices already available to photographers including the above-mentioned patents, do not contemplate a device combining features that minimizes the effort required to transport such equipment to varied locations, makes lighting and related structural support means portable and a part of such a device, and accommodates all of a photographer's necessary equipment for location work in a safe and secure manner.

SUMMARY OF THE INVENTION

It is an object of this invention to provide a self-contained portable apparatus for facilitating, transporting, supporting and storing photographic equipment.

Another object of this invention is to facilitate transport of photographic equipment to assignments.

Yet another object of this invention is to provide a wheeled portable transport apparatus capable of functioning in different configurations to negotiate different types of terrain.

Another object of this invention is to provide means for the component parts to be detachably connected to each other to further enhance transport and portability of the photographic equipment.

Still another object of this invention is to provide support for photographic lighting and light reflecting equipment.

It is another object of this invention to provide a safe and secure means for storing all of a photographer's equipment that he might need on a photographic assignment.

A further object of this invention is to provide storage for said photographic lighting and light reflecting equipment.

These and other objects are satisfied by the invention which provides at least one case for containing equipment, said case having a lower and upper surfaces; a base disposed under and supporting said lower surface of said case, said base including a plurality of wheels extending thereunder to permit wheeled movement of said base, said base further featuring a first cooperating means for connection; a dolly means, said dolly means including a second cooperating means for cooperating with said first cooperating means to connect said dolly to said base, rotatable wheel means for supporting said dolly means and for moving said dolly means over a selected surface; vertically extending, elongated handle means projecting upwardly from said second cooperating means; and clamping means adjustably mounted on said handle means for releasably engaging said upper case surface in a manner to positionally stabilize said case relative to said dolly; where placing said dolly under said case, engaging said first and second cooperating means and engaging said clamping means with said upper case surface, permits rolling movement of said case on said base wheels or alternatively, permits the connected case and dolly means to be tilted and moved on said rotatable wheel means.

In other words, this invention provides an apparatus large enough and strong enough to safely and securely accommodate the photographic equipment a photographer needs on location and that also is capable of wheeled transport in at least two configurations. Furthermore, the invention contemplates separation of its component parts for easier transporting and also provides the photographer with a support for lights and light reflectors to create photographic studio conditions once on location.

This invention provides these and other advantages which will become apparent to the skilled artisan upon review of the following description.

DETAILED DESCRIPTION OF THE INVENTION

Figure 1:
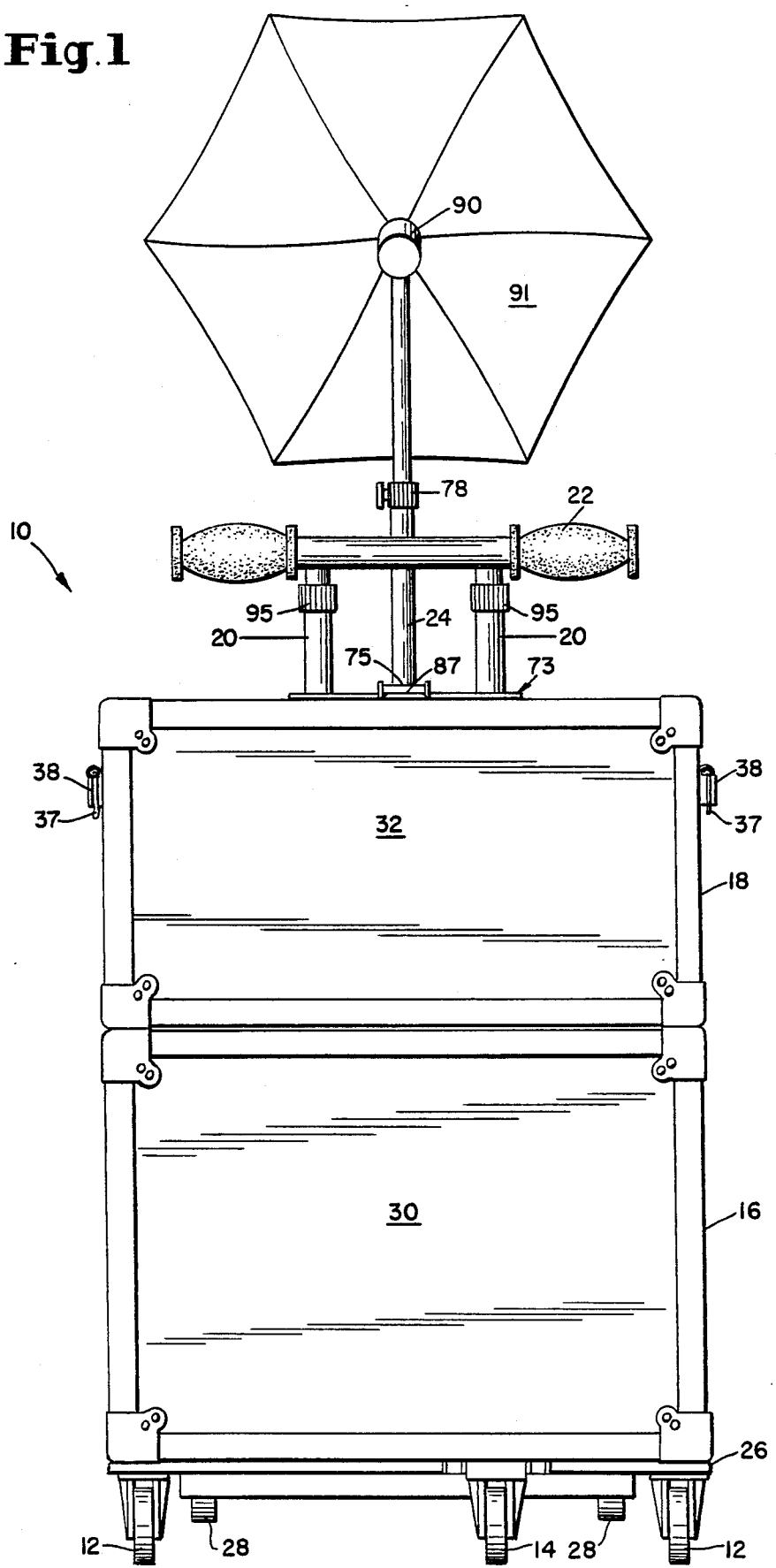
FIG. 1 is a front view of the present invention.

Referring to FIG. 1 apparatus 10, as illustrated, is ready for transport. Apparatus 10 includes base 26, having rotatably attached on its bottom four caster wheels 12 for transport over even surfaces in a cart configuration. Carriage case 16 is attached to and supported by base 26 by bolting or other suitable means. Door 30 is pivotally attached to one side of the front of carriage case 16 by hinges 31 (See FIG. 4) and swings outwardly. Door 30 has a single door caster wheel 14 rotatably attached to the bottom thereof to provide independent support when open.

Figure 2:
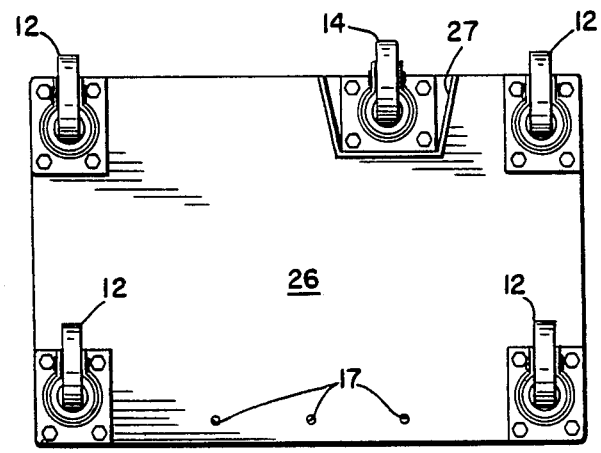
FIG. 2 is a bottom view of the present invention.

FIG. 2 depicts base 26 and illustrates the four caster wheels 12 disposed one at each corner of base 36 and slot 27 which is positioned to receive single door caster wheel 14. Three vertical bores 17, the purpose of which is described more fully below, are located near the edge of base 26 opposite slot 27.

Figure 3:
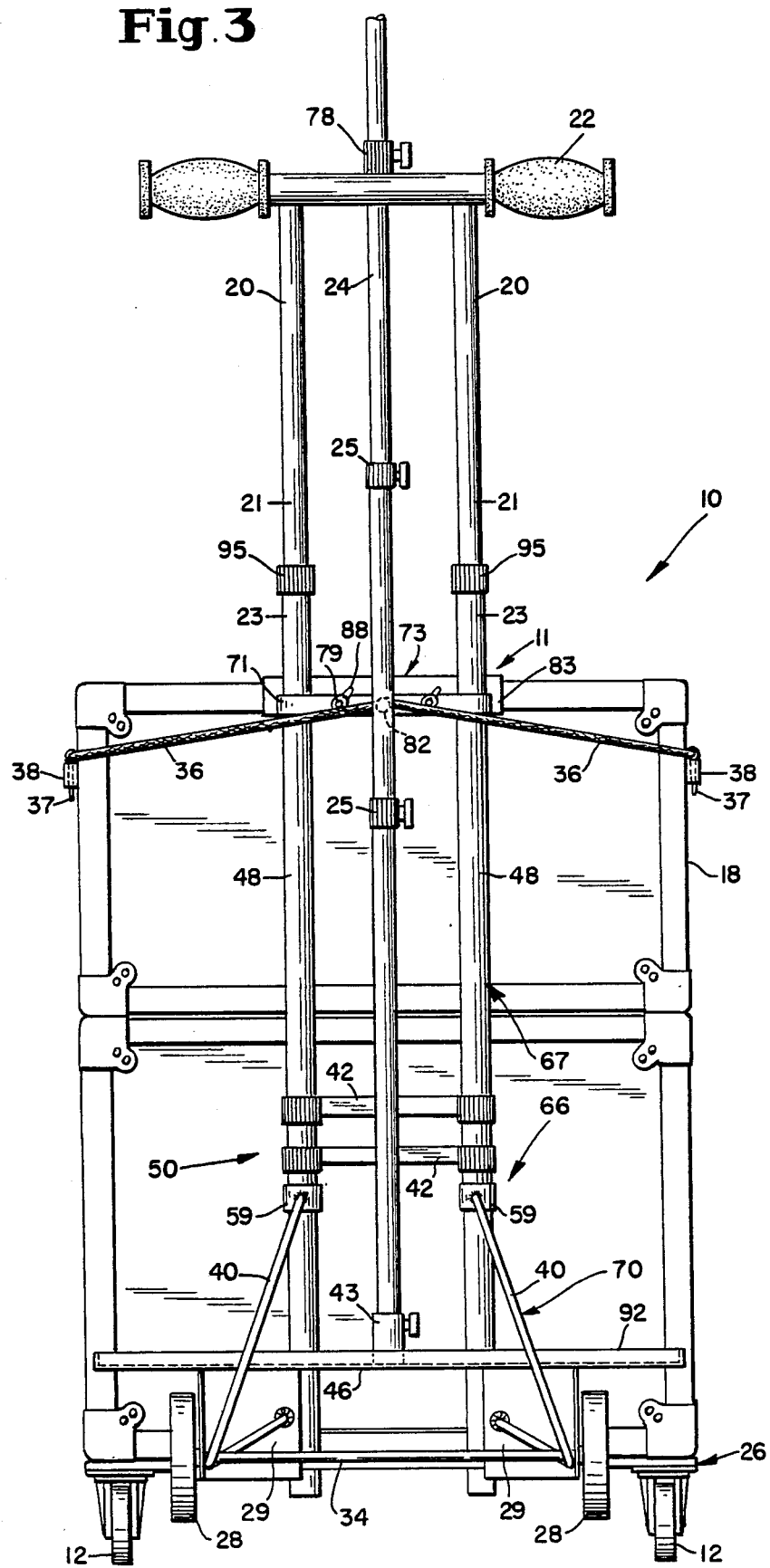
FIG. 3 is a rear view of the invention.

In FIG. 3 the back of the carriage case 16 is illustrated. The lower portion of carriage case 16 features removably connected auxiliary transport device or dolly 50. Dolly 50 consists of lower dolly assembly 66 and upper dolly assembly 67. First addressing lower dolly assembly 66, it features two auxiliary wheels 28 that are connected one on each end to axle 34. When dolly 50 is connected to base 26, axle 34 is offset and parallel to the edge of base 26. Lower dolly assembly 66 also features integrated support unit 70 the components of which are constructed of heavy guage steel. Integrated support unit 70 includes L-shaped spaced axle brackets 29 positioned between auxiliary wheels 28. Axle brackets 29 are welded or securely affixed by other suitable means to the bottom of horizontal tray 46 and to vertically disposed tubular housings 48. Axle brackets 29 are further welded to transverse base engaging member 52.

Referring specifically to transverse base engaging member 52, it has three vertical lugs 51 (see FIG. 5) projecting from its top surface which are adapted to cooperate with and be received in bores 17. Also associated with lower dolly assembly 66 is horizontal tray 46 which is superposed relative to auxiliary wheels 28 and axle 34. Horizontal tray 46 provides slots along the edge closest to carriage base 16 to permit tubular housings 48 to extend vertically therethrough. Also featured are short metal lip 92 projecting above and along the remaining three edges and lastly light support flange 43 with associated connecting sleeve 45. As will become apparent below, horizontal tray 46 serves as a stable platform for storing tripod assemblies or light reflectors against the back of the apparatus 10.

Stabilizer bars 40 are attached by welding to each of axle brackets 29 at one end and by sleeve couplers 59 one to each of tubular housings 48 at the other end. Stabilizer bars 40 provide enhanced stability to apparatus 10 in transport. Turning to the last principal element of assembly 66, tubular housings 48 are vertically disposed in a spaced relationship, parallel to each other, are attached by welding to transverse base engaging member 52, and are interconnected by horizontal sleeve connector trusses 42 above platform 46. Tubular housings 48 comprise the upper most portion of lower assembly 66 and are adapted to support and receive telescoping tubular members 20.

Upper dolly assembly 67 features telescoping tubular members 20 that are parallel to each other, coaxial with and adapted to be received and supported by tubular housings 48. Tubular members 20 include upper extensions 21 which telescopes and is adapted to be received and supported by lower extensions 23. The length of extension 21 and 23 relative to each other is adjustable due to releasable locking of compression sleeve couplers 95. Extensions 21 and 23 are joined at their top ends by transverse handle element 22. Turning to the next feature, keeper assembly 11 releasably engages the top of upper case 18 and extends between vertical telescoping tubular members 20. Keeper assembly 11 features clamp 71, L-shaped guide 73 and elongated latch hook 75. Clamp 71 and L-shaped guide 73 cooperate to releasably engage the front and back respectively of telescoping tubular members 20. Lower leg 83 of L-shaped guide 73 includes threaded bolts 79 of sufficient length to extend horizontally through clamp 71 which incorporates apertures 81. In order to enhance frictional engagement, clamp 71 features rounded ends of substantially the same curvature as tubular members 20 thereby increasing the surface area that engages members 20 when wing nuts are tightened. The engaging surface of lower leg 83 may be covered with a compressible elastic pad to further augment friction and engagement. When extended through apertures 81 wing nuts 88 are tightened down on threaded bolts 79 thereby causing clamp 71 to move toward and engage tubular members 20. Feedthrough 82 for restraint cable 36 is connected to clamp 71. Restraint cable 36, made of a stretchable cord material having hooks 37 disposed at each end, is adapted to stretch across the back of upper case 18 to stabilize equipment supported by tray 46. Upper leg 86 of L-shaped guide 73 projects horizontally and is of sufficient length to abut the upper surface of upper case 18. (See FIG. 4.) Upper leg 86 serves to secure dolly 50 to both base 26 and upper case 18. Upper leg 86 further includes latch hook 75 which is pivotally attached thereto. Latch hook 75 includes an elongated hook element 87 for releasably engaging complimentary slot 80 located on top of upper case 18. When engaged, latch hook 75 provides additional stability for when apparatus 10 is moved.

Upper dolly assembly 67 also features retractable and removable tubular light support stand 24 which extends vertically from light support flange 43 on platform 46. Stand 24 is secured to flange 43 upon tightening of sleeve 45. Handle sleeve 78 integral with handle element 22 is designed to journal a portion of stand 24 for further support and stability thereof. Stand 24 further features two compmression sleeves 25 one below the top of upper case 18 and one above transverse handle 22 for height adjustment purposes. The top end of light support stand 24 incorporates conventional hardware to allow for the attachment of lighting device 90 and/or light reflector 91. (See FIG. 1.)

Figure 4:
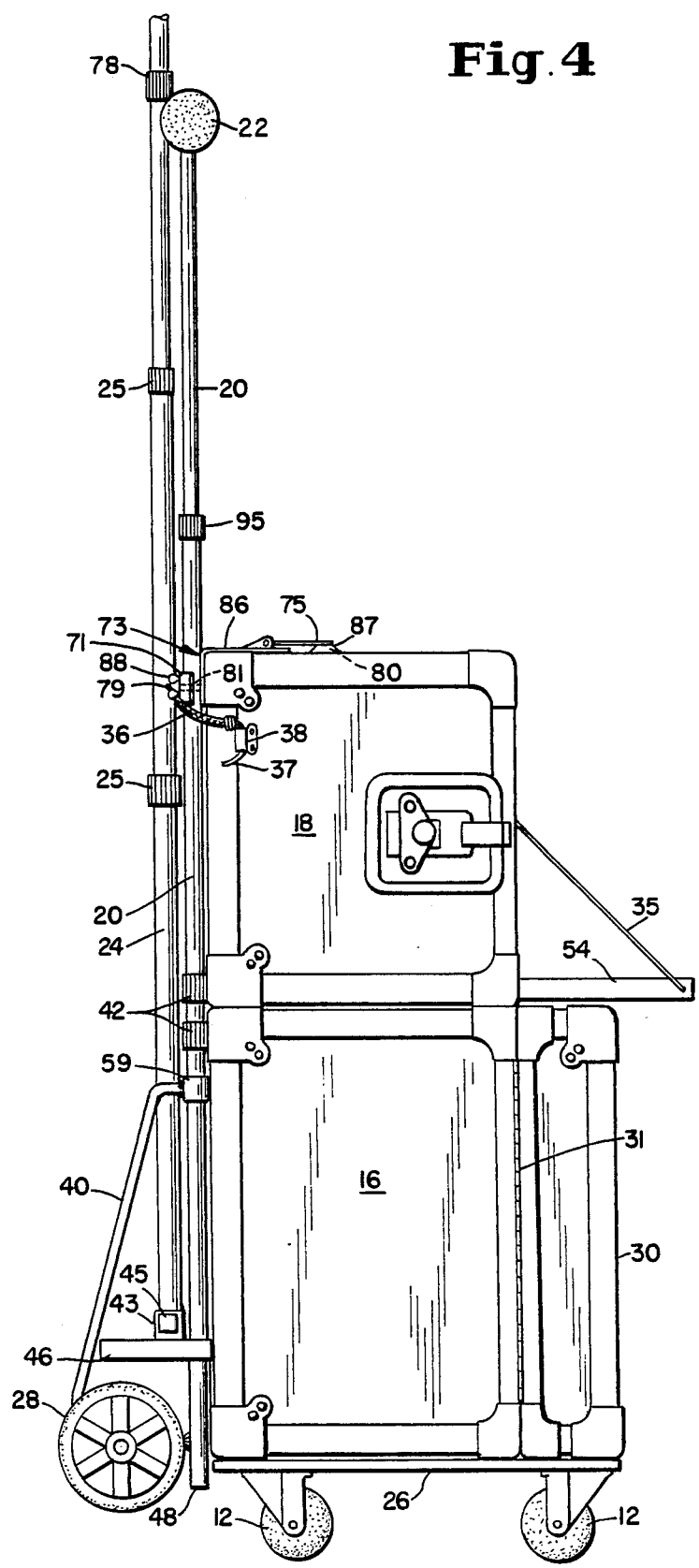
FIG. 4 is a side view of the invention on location.

Turning to FIG. 4, it depicts a side view of the invention ready for use on location. Upper case 18 is removably attached to the top of and supported by carriage case 16. Upper case 18 features cover 32 that is removably attached by hinge 33 on front side thereof. The interior of upper case 18 includes pivotal shelf 54 which is attached along the lower front edge of upper case 18. Shelf 54 is movable between vertical storage configuration to a horizontal position for use in location work in a shelf configuration. When in the horizontal, working configuration, cables 35 provide additional support to shelf 54. Upper case 18 also includes vertically disposed C-shaped members 38 located on each side wall for engaging hooks 37 at the end of restraint cable 36 to secure equipment onto the back of apparatus 10. As described above, slot 80 is located on the top of case 18 to coact with pivotal latch 75. when dolly 50 is attached thereto.

Figure 5:
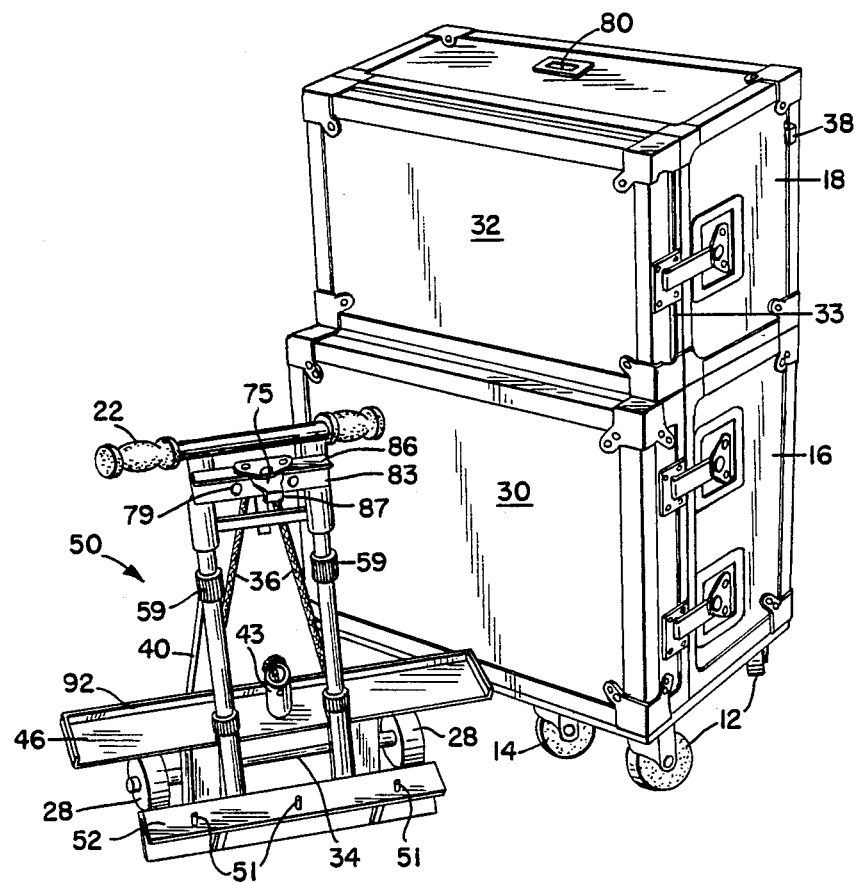
FIG. 5 is a sectional representation of the components of the invention.

FIG. 5 depicts the apparatus separated into its principal component parts; carriage case 16, upper case 18 and dolly 50. As is readily appreciated, apparatus 10 is easily disassembled for storage and/or transport. As such this invention allows the component parts of apparatus 10 to be used separately.

Referring to structural features of disassembled apparatus 10, compression sleeve couplings 95 are loosened and tubular members 20 are telescoped downwardly into tubular housings 48. Hooks 37, for convenience, are hooked onto axle 34.

Apparatus 10 can be assembled for transport by first resting upper case 18 on top of carriage case 16 in a manner such that the backs of both cases are aligned vertically with each other. Dolly 50 is assembled by disengaging hooks 37 of the restraint cable 36 from axle 34, raising telescoping tubular members 20 and locking them by tightening compression sleeve couplings 95. Dolly 50 is then positioned under base 26 in a manner such that vertical lugs 51 of transverse base engaging member 52 correspond to bores 17 and when lifted, slide into bores 17. Guide 73 is then translated so that upper leg 86 abuts upper surface of case 18. When guide 73 and clamp 71 are tightened, dolly 50 is fixedly engaged with cases 18 and 16. Thereafter, latch hook 75 is pivoted to clamp into slot 80. Hooks 37 of restraint cable 36 can then be hooked to vertically disposed C-shaped members 38 to stabilize tripod or light support stand supported by tray 46.

Dolly 50, when attached, allows apparatus to be supported by and transported on wheels 28 when tilted. Apparatus 10 may, therefore, be transported over stairs or uneven surfaces. Apparatus 10 is also movable on wheels 12 and 14 over even surfaces in a conventional cart configuration.

Once on location, apparatus 10 may be converted to a mobile studio configuration. Cover 32 of upper case 18 may be removed and stored on top of case 18 to allow photographer access pivotal shelf 54. Tubular light support stand 24 is then inserted into light support flange 43 and associated connecting sleeve 45 is tightened to secure stand 24 in place. Stand 24 is then telescoped upwardly to a desired height and sleeves 25 and handle sleeve 78 are tightened. Stand 24 is then ready to secure lighting device 90 and/or light reflector 91.

Alternative embodiments of the invention such as the addition of caterpillar treads to dolly 50, the use of interlocking cases, etc., should now be apparent to those skilled in the art. Accordingly, these and other embodiments are contemplated to fall within the spirit and scope of the invention as defined in the following claims.

I claim:
1. A combination apparatus for storage, transport and support of equipments, comprising:
   at least one case for containing equipment, said case having lower and upper surfaces;
   a base disposed under and supporting said lower surface of said case, said base including a plurality of wheels extending thereunder to permit wheeled movement of said base, said base further featuring a plurality of bores for connection;
   a dolly means, said dolly means including a plurality of lugs for cooperating with said bores to connect said dolly to said base, rotatable wheel means for supporting said dolly means and for moving said dolly means over a selected surface;
   vertically extending, adjustable over a large-range of heights elongated handle means including an upper housing projecting upwardly from said lugs; and
   clamping means adjustably mounted on said handle means, that project over said upper case surface and extending a selected distance over and perpendicular to said lugs in a manner to releasably engage said upper case surface for positionally stabilizing said case relative to said dolly by locking it thereto;
   where placing said dolly under said case, engaging said lugs and bores and engaging said clamping means by engaging and locking it to said upper case surface, permits rolling movement of said case on said base wheels or alternatively, permits the connected case and dolly means to be tilted and moved on said rotatable wheel means.

2. A combination apparatus according to claim 1 further comprising a second case disposed on said upper surface of said first case and engagable with said connecting means for engaging the upper surface of said second case, said connecting means being secured to said handle means and capable of movement thereon;
   where when said lugs and bores, said clamping means and said connecting means are engaged said base, cases, and dolly form an integrated unit for transport in a plurality of configurations.

3. A combination apparatus according to claim 2 wherein said handle means is tubular and includes an upper housing, telescoping pole means adapted to be received in said housing and having upper and lower ends, and connector sleeve means for adjusting and securing said housing and pole at desired length.

4. A combination device according to claim 1 further comprising a horizontal platform integrated with said dolly means projecting from the side opposite said case for supporting elongated equipment thereon.

5. A combination device according to claim 4 further comprising means for securing elongated equipment on said platform, said means being integrated with said clamping means.

6. A combination device according to claim 1 further comprising an elongated hook means for engaging said upper surface of said case, said hook means being attached to said clamping means.

7. A combination apparatus for storage, transport and support of equipments, comprising:
   at least one case for containing equipment, said case having lower and upper surfaces;
   a base disposed under and supporting said lower surface of said case, said base including a plurality of wheels extending thereunder to permit wheeled movement of said base, said base further featuring a first cooperating means for connection;

a dolly means, said dolly means including a second cooperating means for cooperating with said first cooperating means to connect said dolly to said base, rotatable wheel means for supporting said dolly means and for moving said dolly means over a selected surface;

a horizontal platform integrated with said dolly means from the side opposite said case for supporting elongated equipment thereon containing a lower housing to accommodate a telescoping pole means having upper and lower ends.

8. A combination device according to claim 7 wherein said upper end of said telescoping pole means provides support for a lighting means.

9. A combination device according to claim 3 wherein said upper end of said telescoping pole means provides support for a lighting means.

10. A combination device according to claim 1, wherein at least one of said cases includes a cover which upon removal of said cover allows use of a horizontal shelf projecting from the side of the case opposite said dolly means.

11. In combination, a base having a plurality of wheels;

a first container case including a hinged door complementary to and adapted to be supported by said base;

a rotatable wheel means to support said hinged door of said first container means;

a second container case having an upper and lower surface, said lower surface complementary to said first container case and adapted to seat thereon;

a dolly means incorporating wheel means for moving said dolly when said dolly is tilted and elongated handle means;

first connecting means for connecting said dolly to said base; and second connecting means for engaging the upper surface of said second case, said second connecting means being secured to said handle means and capable of movement thereon;

where when said first and second connecting means are connected to said base and second cases respectively, said base, cases and dolly form an integrated unit for transport in plurality of configurations.

* * * * *